(12) United States Patent
Yang et al.

(10) Patent No.: US 11,347,315 B2
(45) Date of Patent: May 31, 2022

(54) ELECTRONIC DEVICE WITH FORCE SENSOR AND HAPTIC FEEDBACK IN DIRECTION PERPENDICULAR TO A DIRECTION OF PRESS

(71) Applicants: TIANMA JAPAN, LTD., Kanagawa (JP); Wuhan Tianma Micro-Electronics Co., Ltd., Wuhan (CN)

(72) Inventors: Yiping Yang, Kawasaki (JP); Hiroshi Haga, Kawasaki (JP); Harue Sasaki, Kawasaki (JP); Daisuke Sugimoto, Kawasaki (JP); Takuya Asai, Kawasaki (JP); Koji Shigemura, Kawasaki (JP)

(73) Assignees: TIANMA JAPAN, LTD., Kanagawa (JP); Wuhan Tianma Micro-Electronics Co., Ltd., Kanagawa (JP)

(*) Notice: Subject to any disclaimer, the term of this patent is extended or adjusted under 35 U.S.C. 154(b) by 0 days.

(21) Appl. No.: 17/203,852

(22) Filed: Mar. 17, 2021

(65) Prior Publication Data
US 2021/0200320 A1    Jul. 1, 2021

Related U.S. Application Data

(63) Continuation of application No. 16/394,880, filed on Apr. 25, 2019, now Pat. No. 10,976,823.

(30) Foreign Application Priority Data

Apr. 26, 2018  (JP) .............................. JP2018-085251
Nov. 27, 2018  (JP) .............................. JP2018-221310

(51) Int. Cl.
*G06F 3/01*    (2006.01)

(52) U.S. Cl.
CPC .................................. *G06F 3/016* (2013.01)

(58) Field of Classification Search
CPC ...... G06F 3/016; G06F 3/04166; G06F 3/044; G06F 2203/04105; G06F 2203/04166
See application file for complete search history.

(56) References Cited

U.S. PATENT DOCUMENTS

| 10,976,823 B2 | 4/2021 | Yang et al. |
| 2008/0024459 A1 | 1/2008 | Poupyrev et al. |

(Continued)

FOREIGN PATENT DOCUMENTS

| JP | 2008-033739 A | 2/2008 |
| JP | 2016-095832 A | 5/2016 |

OTHER PUBLICATIONS

Communication dated Oct. 21, 2021, issued by the U.S. Patent and Trademark Office in U.S. Appl. No. 17/203,836.

*Primary Examiner* — Liliana Cerullo
(74) *Attorney, Agent, or Firm* — Sughrue Mion, PLLC (57) ABSTRACT

An electronic device having a display screen that displays a user interface including at least one object, comprising a display mechanism that displays the user interface; a coordinate detection mechanism that detects coordinates of a user touch point on the display screen; a first feedback presentation mechanism that presents tactile feedback at a prescribed point to make the user perceive the presence of an object; a measurement mechanism that measures a force generated by the user pressing the display screen; and a second feedback presentation mechanism that detects an operation trigger based on the force and generates mechanical vibration.

5 Claims, 8 Drawing Sheets

(56) References Cited

U.S. PATENT DOCUMENTS

| | | |
|---|---|---|
| 2011/0084910 A1 | 4/2011 | Almalki et al. |
| 2013/0222267 A1 | 8/2013 | Almalki |
| 2014/0028606 A1 | 1/2014 | Giannetta |
| 2015/0177899 A1* | 6/2015 | Degner .................. G06F 3/016 345/174 |
| 2015/0268725 A1 | 9/2015 | Levesque |
| 2016/0132115 A1 | 5/2016 | Haga et al. |
| 2017/0285848 A1* | 10/2017 | Rosenberg ............ G06F 3/0202 |
| 2018/0224990 A1 | 8/2018 | Shim |
| 2019/0033972 A1 | 1/2019 | Nakao |
| 2019/0064997 A1* | 2/2019 | Wang ...................... G06F 3/016 |
| 2019/0102008 A1 | 4/2019 | Takada |

\* cited by examiner

ELECTRONIC DEVICE WITH FORCE SENSOR AND HAPTIC FEEDBACK IN DIRECTION PERPENDICULAR TO A DIRECTION OF PRESS

CROSS-REFERENCE TO RELATED APPLICATIONS

This application is a continuation of non-provisional U.S. application Ser. No. 16/394,880 filed Apr. 25, 2019, which claims priority under 35 U.S.C. § 119(a) on Patent Application No. 2018-085251 filed in Japan on Apr. 26, 2018, and Patent Application No. 2018-221310 filed in Japan on Nov. 27, 2018, the entire content of which is hereby incorporated by reference.

BACKGROUND

The present invention relates to an electronic device that provides feedback on an object included in a user interface.

In recent years, electronic devices equipped with a touch panel such as a smartphone or a car navigation become popular.

When a user operates an object such as an icon included in a user interface displayed via the touch panel, the electronic device activates the function corresponding to the object.

SUMMARY OF THE INVENTION

The user feels the same texture of the touch panel regardless of any part of the panel, because the entire surface of the touch panel is uniformly hard. Thus, it is desirable to provide feedback to the user so that the user can perceive the presence of an object, without activating the function corresponding to the object. Also, it is desirable to provide feedback to a user so that the user can perceive that the operation to activate the function has been accepted when the function corresponding to the object is activated.

As a technology to solve the above-mentioned problem, the technology described in Japanese Patent Application Laid-open Publication No. 2008-33739 is known. Japanese Patent Application Laid-open Publication No. 2008-33739 discloses (1) a device provides force feedback 302 so that a user 2 can "feel" a GUI object 310 when the user 2 touches a point that is in the hotspot or that intersects with the border of the GUI object 310 and when the pressure value is less than an activation threshold value. (2) Thereafter, the user 2 presses the GUI object 310 with a stronger force to increase the pressure value to a level greater than an activation threshold value 321. The GUI object 310 is activated by this user's operation, and the device provides force feedback 304 and visual feedback 305 in order to notify the user 2 that the GUI object 310 is selected and activated.

An aspect of this disclosure is an optical element comprising: an electronic device having a display screen that displays a user interface including at least one object, comprising: a display mechanism that displays the user interface; a coordinate detection mechanism that detects coordinates of a user touch point on the display screen; a first feedback presentation mechanism that presents tactile feedback at a prescribed point to make the user perceive the presence of an object a measurement mechanism that measures a force generated by the user pressing the display screen; and a second feedback presentation mechanism that detects an operation trigger based on the force and generates mechanical vibration.

DETAILED DESCRIPTION OF THE EMBODIMENTS

Below, embodiments of the present invention will be explained with reference to figures. However, the present invention shall not be interpreted as limited to the descriptions of embodiments below. It is easily understood by a person skilled in the art that the specific configurations of the present invention can be modified without departing from the concept and scope of the present invention.

Embodiment 1

Figure 1:
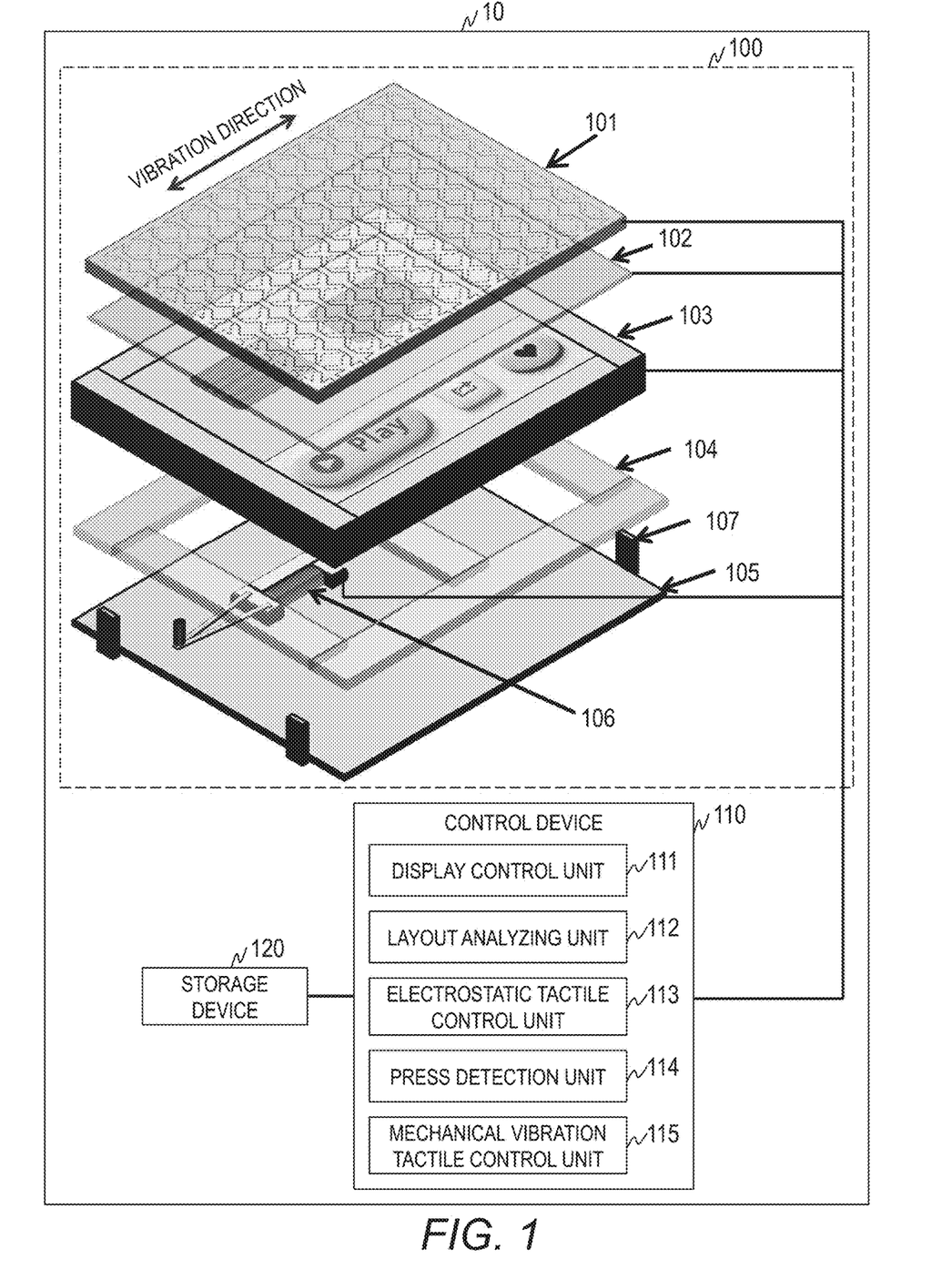
FIG. 1 is a diagram illustrating a configuration example of an electronic device of Embodiment 1.

FIG. 1 is a diagram illustrating a configuration example of an electronic device 10 of Embodiment 1.

The electronic device 10 includes a tactile presentation device 100, a control device 110, and a storage device 120. The tactile presentation device 100 and the control device 110 are connected to each other via a connection line, and the control device 110 and the storage device 120 are connected to each other via a connection line.

The tactile presentation device 100 presents a user with a UI (user interface) including at least one object, and accepts an operation via the UI. In addition, the tactile presentation device 100 provides feedback for the user to perceive the presence of an object included in the UI, and feedback for the user to perceive that an operation on the object has been accepted.

The tactile presentation device 100 includes an electrostatic tactile panel/touch panel 101, a force sensor 102, a liquid crystal display (LCD) 103, a carrier 104, a base 105, a lateral actuator 106, and a plate spring 107. The respective components of the tactile presentation device 100 are stored in an appropriate case. The electrostatic tactile panel/touch panel 101, the force sensor 102, and the liquid crystal display 103 are configured to realize a display screen for displaying the UI, and the carrier 104, the lateral actuator 106, and the plate spring 107 are configured to provide mechanical vibration.

The base 105 is a component serving as a base of the tactile presentation device 100. The lateral actuator 106 and the plate spring 107 are mounted on the base 105. Also, on the base 105, the carrier 104 that vibrates due to the effects of the lateral actuator 106 and the plate spring 107 is mounted. The carrier 104 vibrates in a specific direction with respect to the base 105. In the description below, the vibration of the carrier 104 generated by the lateral actuator 106 and the plate spring 107 will also be referred to as mechanical vibration.

The lateral actuator 106 is a device that generates lateral movement in the direction horizontal to the display device (such as X direction or Y direction). The plate spring 107 is a mechanism to generate vibration in accordance with the movement of the lateral actuator 106.

The carrier 104 is a component serving as a base to stack up the respective components of the display screen. On the carrier 104, the liquid crystal display 103, the force sensor 102, and the electrostatic tactile panel/touch panel 101 are mounted.

In Embodiment 1, those components are configured to generate vibration in a direction substantially parallel to the horizontal direction of the display screen of the display device.

The liquid crystal display 103, the force sensor 102, and the electrostatic tactile panel/touch panel 101 are placed so as to be substantially parallel to the base 105.

The electrostatic tactile panel/touch panel 101 includes an electrostatic tactile panel 200 (see FIG. 2) and a touch panel. The electrostatic tactile panel 200 provides a texture feeling of the object using the electrostatic force when the user drags the UI. The touch panel is configured to detect the position of the finger of the user on the display screen. The structure and operation of the electrostatic tactile panel 200 will be explained with reference to FIGS. 2A and 2B.

The force sensor 102 measures the fare applied by the finger of the user to the display screen. In Embodiment 1, the force sensor 102 measures the force in a direction substantially parallel to the vertical direction of the display screen. That is, the force sensor 102 measures the force in the pressing direction. The liquid crystal display 103 displays an image corresponding to the UI. The force sensor 102 outputs a difference (relative value) between the baseline, which is a reference value of the force (zero point), and the measurement value. In the description below, "force measurement" means to calculate the relative value, and the "measurement value of force" means the relative value.

The control device 110 is an arithmetic device that executes programs. Examples of the arithmetic device is a processor, GPU (Graphics Processing Unit), and FPGA (Field Programmable Gate Array). The storage device 120 stores therein programs and data used by the control device 110. The storage device 120 is a memory, for example. The storage device 120 includes a work area used by programs. The programs may be installed in the electronic device 10 in advance, or may be installed from a storage medium having the programs stored therein.

The control device 110 operates as a functional unit (module) to control the tactile presentation device 100. Specifically, the control device 110 acts as a display control unit 111, a layout analyzing unit 112, an electrostatic tactile control unit 113, a press detection unit 114, and a mechanical vibration tactile control unit 115.

The display control unit 111 controls the display of the UI on the display screen. Specifically, the display control unit 111 retrieves setting information of the UI from the storage device 120, and controls the liquid crystal display 103 according to the setting information so that the UI including at least one object is displayed. The setting information of the UI includes the layout of the object, the attribute of the object, and the like. The attributes of the object include information as to whether the feedback needs to be provided or not.

The layout analyzing unit 112 analyzes the setting information of the UI, and identifies the layout of the object and the attribute of the object included in the UI. The layout analyzing unit 112 outputs the layout of the object and the attribute of the object to the electrostatic tactile control unit 113.

The electrostatic tactile control unit 113 controls the electrostatic tactile panel/touch panel 101 so that the texture feeling is provided at the position of a prescribed object on the display screen.

The press detection unit 114 detects the finger of the user touching the display screen based on the output from the electrostatic tactile panel/touch panel 101, and identifies the position of the finger of the user on the display screen (touch position). The press detection unit 114 detects a press event for the object based on the force measured by the force sensor 102, the position of the user's finger on the display screen, and the setting information of the UI. The press event for the object means an operation performed by the user to press down the object. When detecting the press event for the object, the press detection unit 114 outputs a request to generate mechanical vibration to the mechanical vibration tactile control unit 115 to make the user perceive that the operation performed on the object has been accepted.

The mechanical vibration tactile control unit 115 controls the lateral actuator 106 to generate mechanical vibration.

For each functional unit included in the control device 110, a plurality of functional units may be integrated into one functional unit, or one functional unit may be divided into a plurality of functional units for each function.

The electronic device 10 of Embodiment 1 includes a display mechanism that displays the UI, a first feedback presentation mechanism that presents tactile feedback at a prescribed point to make the user perceive the presence of an object; a coordinate detection mechanism that detects coordinates of a user touch point on the display screen; a measurement mechanism that measures a force generated by the user pressing the display screen; and a second feedback presentation mechanism that generates mechanical vibration to perceive the user that the operation performed on the object has been accepted.

The configuration to realize the display mechanism is the liquid crystal display (LCD) 103 and the display control unit 111, for example. The configuration to realize the first feedback presentation mechanism is the electrostatic tactile panel/touch panel 101 and the electrostatic tactile control unit 113, for example. The configuration to realize the coordinate detection mechanism is the electrostatic tactile panel/touch panel 101 and the press detection unit 114, for example. The configuration to realize the measurement mechanism is the force sensor 102, for example. The configuration to realize the second feedback presentation mechanism is the carrier 104, the base 105, the lateral actuator 106, the plate spring 107, and the mechanical vibration tactile control unit 115, for example.

Figure 2A:
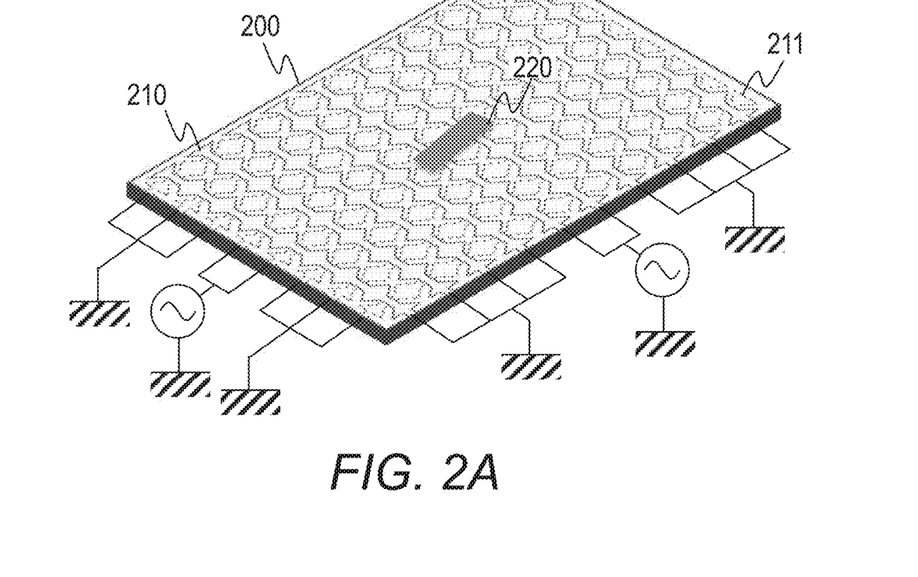
FIG. 2A and FIG. 2B are diagrams for explaining the structure and operation of an electrostatic tactile panel of Embodiment 1.
Figure 2B:
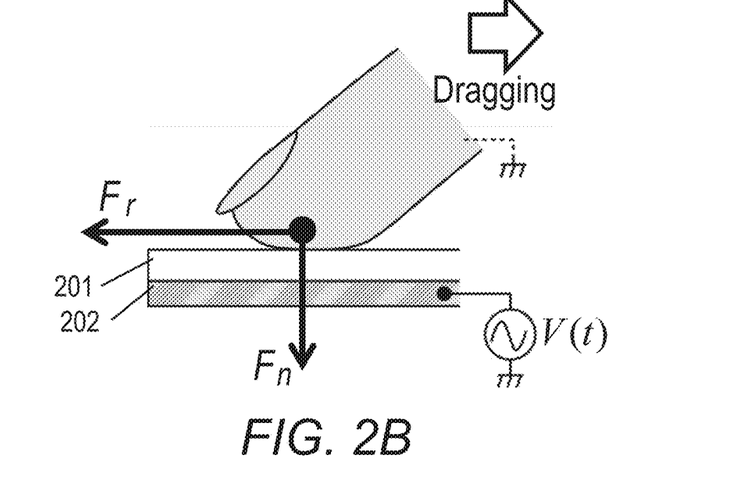

FIG. 2A and FIG. 2B are diagrams for explaining the structure and operation of the electrostatic tactile panel 200 of Embodiment 1. In Embodiment 1, the electrostatic tactile panel 200 described in Japanese Patent Application Laid-Open Publication No. 2016-95832 is used for a device to provide feedback.

The electrostatic tactile panel 200 is configured to a substrate on which a plurality of electrodes 210 and a plurality of electrodes 211 are patterned, and a circuit (not illustrated in the figure) that supplies a voltage to each of the plurality of electrodes 210 and the plurality of electrodes 211. The substrate has an insulating layer 201 and an electrode layer 202.

The electrodes 210 and the electrodes 211 are arranged in such a manner that the respective electrodes intersect with each other. Portions where the electrodes 210 and the electrodes 211 overlap intersect with each other via an insulating film. Also, an insulating film is formed above the electrodes 210 and the electrodes 211. This way, when the user touches the display screen, the finger and the respective electrodes 210 and 211 are electrically insulated.

Below, the operation of the electrostatic tactile panel 200 to provide a texture feel to an object 220 displayed at the position as illustrated in FIG. 2A on the liquid crystal display 103 will be described.

The electrostatic tactile control unit 113 identifies the electrodes 210 and 211 overlapping the object 220, and outputs, to the electrostatic tactile panel 200, a control signal to apply a voltage to the identified electrodes 210 and 211. The circuit of the electrostatic tactile panel 200 outputs a voltage signal of a frequency required for the identified electrodes 210 and 211 based on the control signal. As a result, a texture feel can be provided to the area where the object 220 is displayed, that is, a specific area of the display screen. In this way, since the texture feel can be presented in a prescribed area only, when a plurality of fingers are dragging the UI at the same time, a texture feel is presented to the finger dragging the object 220 only, not to the fingers dragging anything other than the object 220. When a plurality of users are dragging the UI at the same time, a texture feel is presented to the finger of the user who drags the object 220 only, not to the fingers of the user who drags anything other than the object 220.

The electrodes 210 and 211 not applied with a voltage are grounded so that a voltage is not induced due to the capacitance coupling of the electrodes. Instead of making them grounded, it is also possible to apply a DC voltage or a voltage of a frequency equal to or greater than a prescribed level.

The texture feel presented by applying a voltage to the electrodes 210 and 211 overlapping the object 220 will be explained with reference to FIG. 2B.

When the user operates the electrostatic tactile panel/touch panel 101 at the uppermost layer of the display screen, the friction force Fr is generated in the horizontal direction of the display screen, and the force Fn is generated in the vertical direction of the display screen.

When the user performs an operation (dragging) of tracing the object 220 with a finger, since the friction force on the object 220 differs from that of other areas, the user can feel the texture of the object 220. In the drag operation, the force Fn is sufficiently small.

When the user presses the object 220 on the electrostatic tactile panel/touch panel 101 with a finger, the friction force Fr decreases and the force Fn increases.

The plurality of electrodes 210 and the plurality of electrodes 211 may be used to detect a touch made by an object such as a finger. In this case, the plurality of electrodes 210 and the plurality of electrodes 211 can be divided into a group of electrodes for presenting the electrostatic tactile feedback, and a group of electrodes for detecting a contact of an object in a time divisional manner or space divisional manner. This makes it possible to realize the electrostatic tactile panel/touch panel 101 that doubles as an electrostatic tactile panel and a touch panel. The pressure detection unit 114 detects a contact of the finger based on the electrostatic capacitance generated between the electrodes 210 and 211 due to an operation performed on the touch panel, and identifies the position of the contact.

The electrostatic tactile panel/touch panel 101 that doubles as an electrostatic tactile panel and a touch panel can be realized by incorporating an optical touch sensor into an electrostatic tactile panel.

Figure 3:
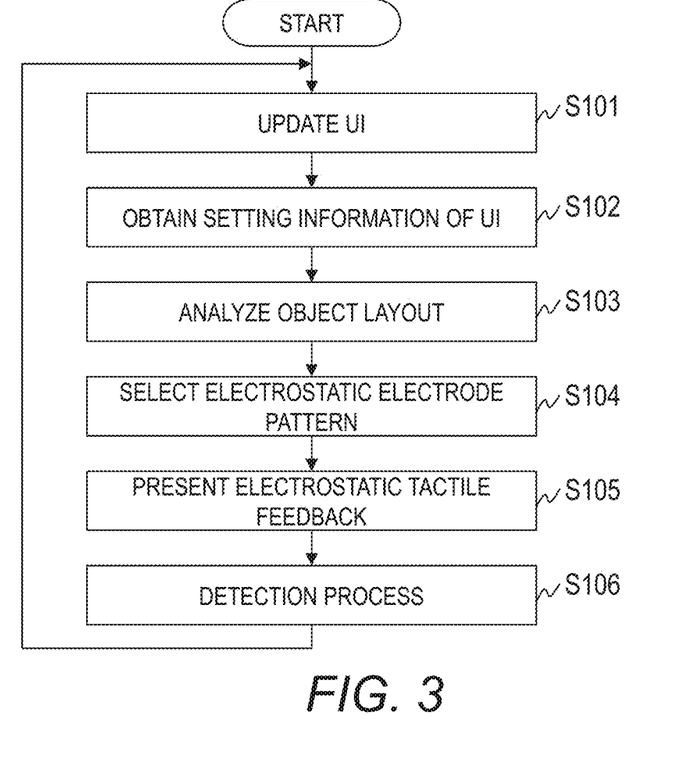
FIG. 3 is a flowchart for explaining the processes performed by the electronic device of Embodiment 1.

Next, the process performed by the electronic device 10 will be explained. FIG. 3 is a flowchart for explaining the processes performed by the electronic device 10 of Embodiment 1.

The display control unit 111 selects a UI to be displayed in the display screen based on the operation state and the like, and controls the liquid crystal display 103 based on the setting information of the selected UI, thereby updating the UI(Step S101).

Next, the layout analyzing unit 112 obtains the setting information of the selected UI from the storage device 120 (Step S102), and analyzes the layout of the object in the UI(Step S103).

Next, the layout analyzing unit 112 selects electrostatic electrode pattern data to apply a voltage to the electrodes 210 and 211 of the electrostatic tactile panel 200 based on the analysis results (Step S104). The electrostatic electrode pattern data specifies the size and frequency of the voltage. The layout analyzing unit 112 outputs the analysis results and the electrostatic electrode pattern data to the electrostatic tactile control unit 113.

The electrostatic tactile control unit 113 presents electrostatic tactile stimulus by applying a voltage to the predetermined electrodes 210 and 211 of the electrostatic tactile panel 200 based on the analysis results and the electrostatic electrode pattern data (Step S105).

Thereafter the press detection unit 114 starts a detection process (Step S106). In the detection process, a touch detection process for detecting the contact of the user's finger on the electrostatic tactile panel/touch panel 101 and a press detection process for detecting a press operation on the electrostatic tactile panel/touch panel 101 are executed.

If the display control unit 111 detects a need for switching the UI caused by an operation of the user or the like, the process returns to Step S101.

Figure 4A:
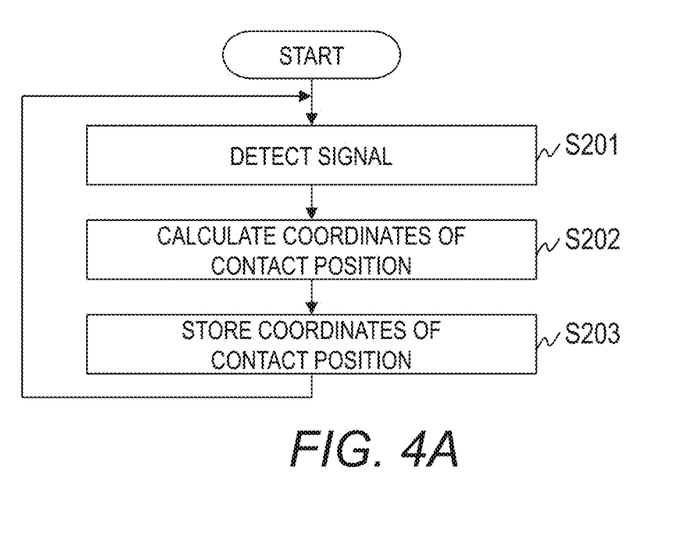
FIG. 4A is a flowchart for explaining a touch detection process performed by a press detection unit of Embodiment 1.

FIG. 4A is a flowchart for explaining a touch detection process performed by the press detection unit 114 of Embodiment 1.

The press detection unit 114 detects a signal indicating that the finger of the user is in contact with the electrostatic tactile panel/touch panel 101 (Step S201). The timing to detect the signal indicating the contact of the user's finger can be set to any appropriate timing.

For example, the press detection unit 114 detects, as the signal, a change in electrostatic capacitance of the electrostatic tactile panel/touch panel 101. A change in value of the force sensor 102 may also be detected as the signal.

Next, the press detection unit 114 calculates the coordinates indicating the touch position of the finger of the user on the electrostatic tactile panel/touch panel 101 (Step S202). The coordinates are calculated based on the position of the electrodes 210 and 211 in which a change in electrostatic capacitance has been detected, for example.

Next, the press detection unit 114 stores the calculated coordinates in the storage device 120 (Step S203). Thereafter, the press detection unit 114 returns to Step S201.

The coordinates previously calculated may be deleted by overwriting it with the newly calculated coordinates or may be managed as history data.

Figure 4B:
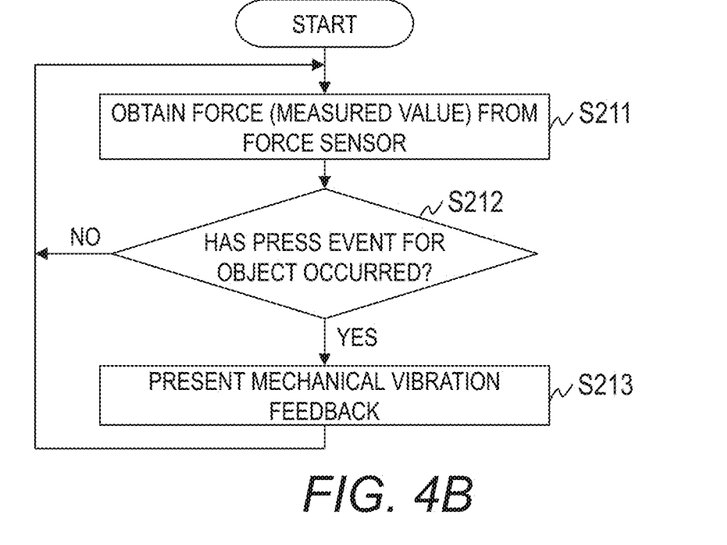
FIG. 4B is a flowchart for explaining a press detection process performed by the press detection unit of Embodiment 1.

FIG. 4B is a flowchart for explaining a press detection process performed by the press detection unit 114 of Embodiment 1.

The press detection unit 114 obtains the value of force measured by the force sensor 102 (Step S211). The timing at which the force sensor 102 measures the force may be set to any appropriate timing. The cycle to perform the touch detection process and the press detection process may be the same or differ from each other.

The press detection unit 114 obtains the coordinates of the contact position (pressed position) from the storage device 120.

The press detection unit 114 determines whether a press event for the object has occurred or not based on the comparison results of the force value and the threshold value and the coordinates of the contact position (Step S212). For example, the press detection unit 114 determines whether the force value is greater than the threshold value or not and whether the coordinates of the contact position coincide with the coordinates of the object or not. If both of the two conditions are met, the press detection unit 114 determines that the press event for the object has occurred. If the determining process used the force value only, the press event could erroneously be detected due to external vibration and the like, which would cause unnecessary feedback to be provided. In the present invention, the determining process uses both of the contact state and the force value, and as a result, the erroneous detection of the press event can be prevented.

If the press detection unit 114 determines that the press event for the object has not occurred, the press detection unit 114 returns to Step S211.

If the press detection unit 114 determines that the press event for the object has occurred, the press detection unit 114 instructs the mechanical vibration tactile control unit 115 to provide feedback via the mechanical vibration (Step S213). Thereafter, the press detection unit 114 returns to Step S211.

After receiving the instruction from the press detection unit 114, the mechanical vibration tactile control unit 115 generates mechanical vibration by controlling the lateral actuator 106. This causes the carrier 104 to vibrate in a specific direction.

The touch detection process and the press detection process are performed in parallel with each other as separate threads. Generally, a drag operation takes place more frequently than a press operation on the electrostatic tactile panel/touch panel 101. If the touch detection process and the press detection process were performed as the same thread, the touch detection process could not be performed until the press detection process is completed. This would worsen the operation efficiency. By performing those two detection processes as separate threads, however, the operation efficiency is improved.

Figure 5:
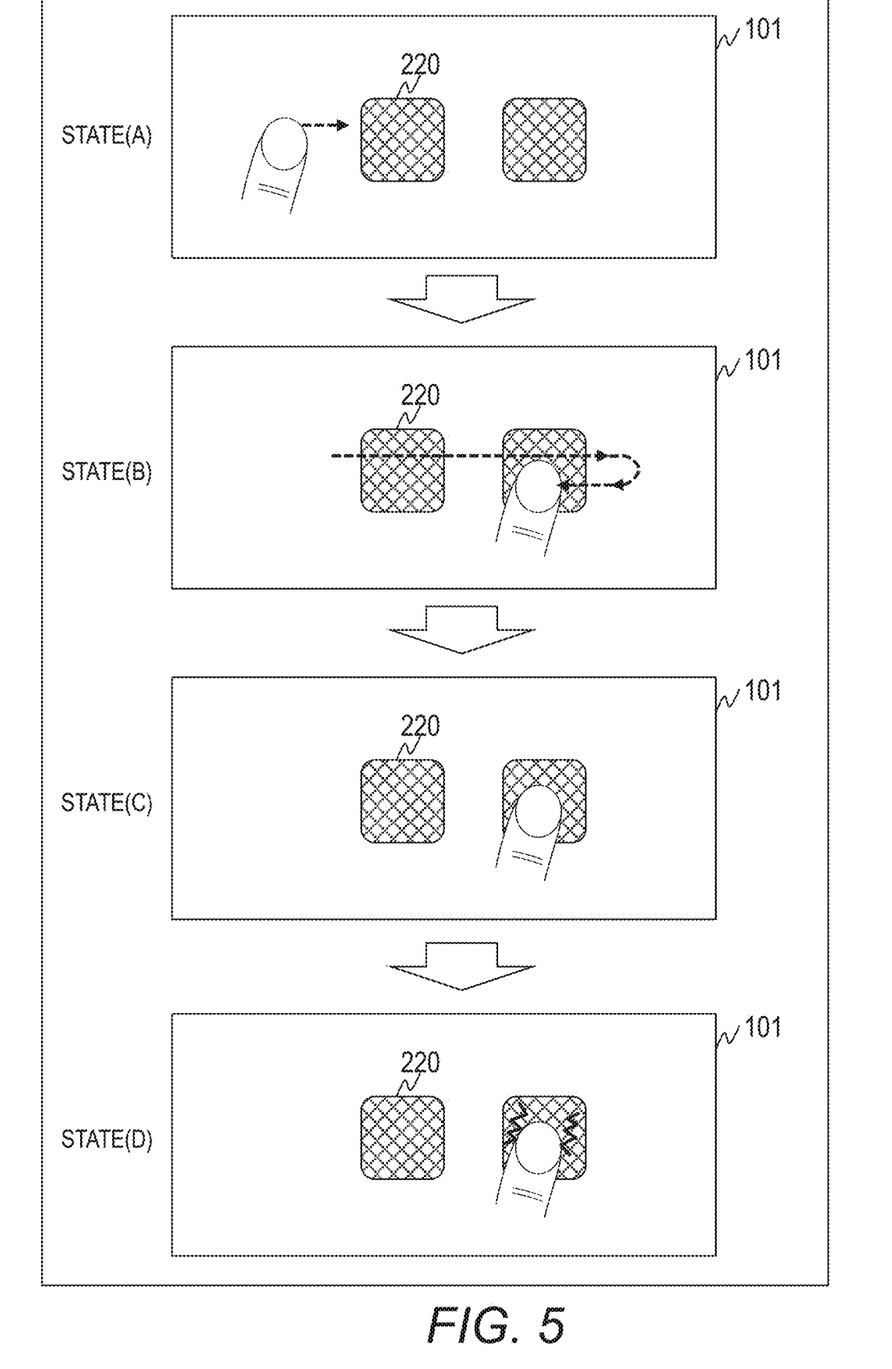
FIG. 5 is a diagram illustrating an example of a tactile presentation as a result of an operation performed on a display screen of the electronic device of Embodiment 1.

FIG. 5 is a diagram illustrating an example of the tactile presentation as a result of the operation performed on the display screen of the electronic device 10 of Embodiment 1.

As illustrated in FIG. 5, two objects 220 are displayed on the electrostatic tactile panel/touch panel 101 at the uppermost layer of the display screen. The finger of the user transitions from the state (A) to the state (D) as illustrated.

The state (A) indicates that the user starts a drag operation of moving the finger along the surface of the electrostatic tactile panel/touch panel 101 to search for an object 220 displayed on the display screen. In this state, electrostatic tactile stimulus is presented at each object 220 by the electrostatic tactile control unit 113. Thus, when the finger of the user passes through the object 220, the user can perceive a texture feel indicating the presence of the object 220.

The state (B) indicates that the user has completed the drag operation and the finger of the user has reached the prescribed object 220. The state (C) indicates that the object 220 is pressed by the user. In state (C), the finger is stopped, and the electrostatic tactile stimulus is smaller. In this case, the press detection unit 114 detects the press event for the object.

The state (D) indicates that mechanical vibrations are generated to perceive the user that the operation performed on the object 220 has been accepted in response to the detection of the press event.

In the UI of the present invention, the user can perform a series of operations from searching for an object to pressing the object without moving the finger away from the display screen. That is, seamless UI is provided.

Next, the effects of the electronic device 10 described in Embodiment 1 will be explained.

(Effect 1) The user can perceive the position of the object 220 by receiving electrostatic tactile feedback. This means that the user can identify position of the object 220 without relying on visual perception.

Figure 6:
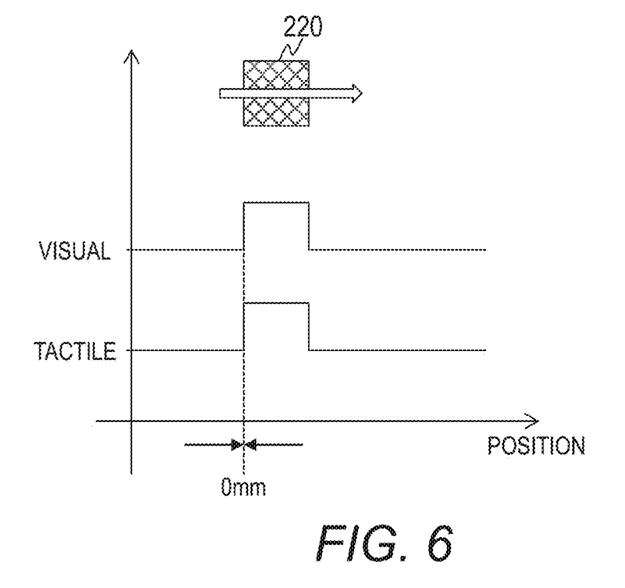
FIG. 6 is a diagram illustrating a misalignment between a display position of an object and a position of the object perceived through feedback in the electronic device of Embodiment 1.

(Effect 2) The electrostatic tactile feedback for perceiving the user of the position of the object 220 is presented in a prescribed area around the object 220 before the user starts performing an operation. FIG. 6 is a diagram illustrating a misalignment between the display position of the object 220 and the position of the object 220 perceived through feedback in the electronic device 10 of Embodiment 1. As illustrated in FIG. 6, there is no misalignment between the position of the object 220 perceived through visual feedback and the position of the object 220 perceived through tactile feedback in the electronic device 10 of Embodiment 1.

(Effect 3) The electronic device 10 is configured to present electrostatic tactile feedback to make the user perceive the presence of the object 220, and mechanical vibration tactile feedback to make the user perceive the operation performed on the object 220. Those two types of feedback are provided through different mechanisms, and it is easy for the user to differentiate the two.

(Effect 4) The mechanical vibration acts in the direction substantially parallel to the horizontal direction of the display screen, and therefore has a smaller effect on the measurement of the force in the vertical direction. Thus, it is possible to appropriately detect a press event for the object 220 while providing feedback to make the object 220 perceived.

(Effect 5) In order to generate the mechanical vibration, large electricity is required. Thus, the conventional device had a problem of requiring large electricity to provide feedback. On the other hand, bemuse the electronic device 10 of the present invention also uses the electrostatic tactile feedback, it is possible to reduce the power consumption compared to the conventional device.

(Effect 6) In the conventional device, the mechanical vibration is used for both of the feedback to make the position of the object 220 perceived and the feedback to perceive that the operation performed on the object 220 has been accepted. However, the electronic device 10 of the present invention is configured to use the mechanical vibration for the feedback to perceive that the operation performed on the object 220 has been accepted only. This improves the life of the mechanism to generate the mechanical vibration.

Embodiment 2

Embodiment 2 differs from Embodiment 1 in the configuration of the tactile presentation device 100. While the display type force sensor 102 was used in Embodiment 1, a small-sized force sensor is used in Embodiment 2.

Figure 7A:
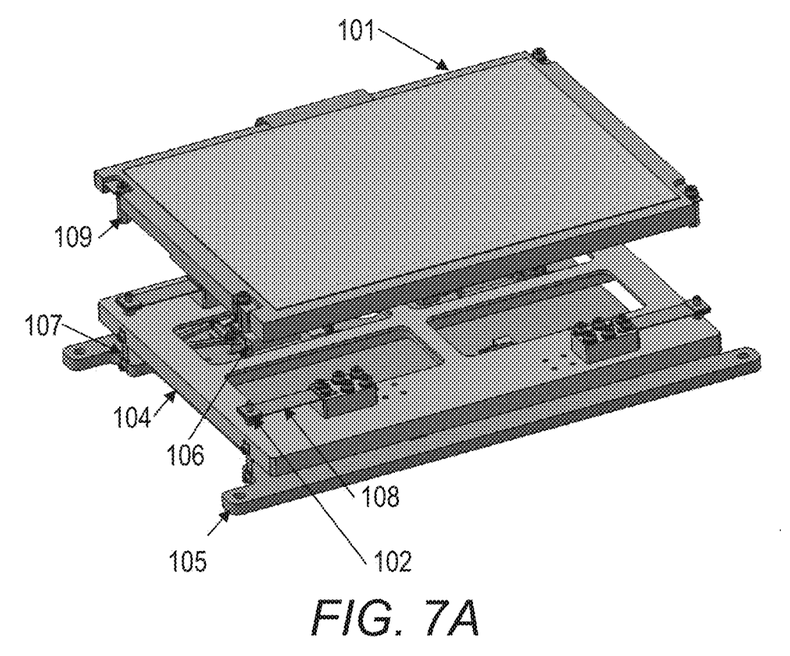
FIG. 7A and FIG. 7B are diagrams illustrating a configuration example of a tactile presentation device of Embodiment 2.
Figure 7B:
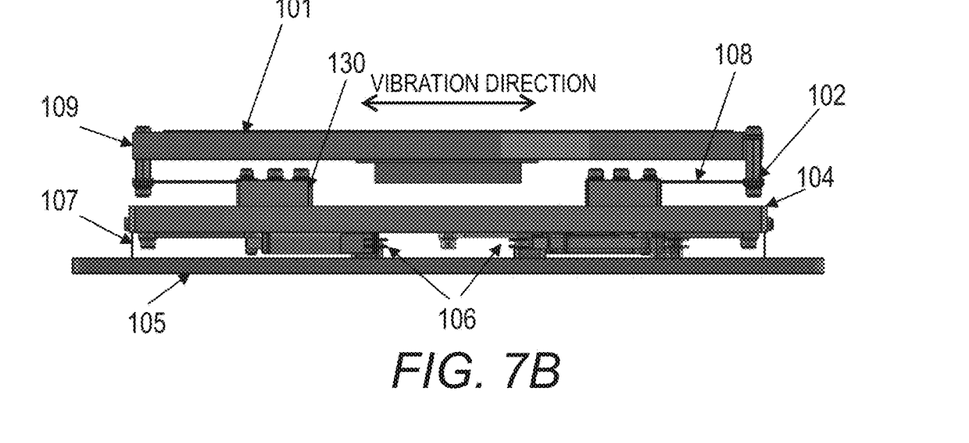

FIG. 7A and FIG. 7B are diagrams illustrating a configuration example of the tactile presentation device 100 of Embodiment 2.

In FIGS. 7A and 7B, the liquid crystal display 103 is mounted on the electrostatic tactile panel/touch panel 101.

On the base 105, the plate spring 107 is mounted so that the carrier 104 vibrates in the direction substantially parallel to the horizontal direction of the display screen. Also, on the base 105, the lateral actuator 106 is mounted to act on the carrier 104 in the direction substantially parallel to the horizontal direction of the display screen.

A beam 108 is mounted on the carrier 104 so as to form a cantilever in substantially parallel with the horizontal direction of the display screen, and a strain gauge is mounted at a predetermined position of the beam 108. The carrier 104 has a small-sized force sensor 102 constituted of the beam 108 and the strain gauge. The beam 108 moves in the vertical direction of the display screen as a result of the user pressing the display screen.

On the frame on which the electrostatic tactile panel/touch panel 101 is mounted, columns 109 to affix the frame to the carrier 104 are disposed.

As illustrated in FIG. 7B, the carrier 104 vibrates in the direction substantially parallel to the horizontal direction of the display screen by the lateral actuator 106 and the plate spring 107.

The control method of the electronic device 10 of Embodiment 2 is the same as the control method of the electronic device 10 of Embodiment 1, and therefore the description thereof is omitted.

By using the small-sized force sensor 102 for the tactile presentation device 100, instead of the display type force sensor 102, it is possible to improve the display quality of the UI displayed on the display screen.

In the structure as illustrated in FIGS. 7A and 7B, the vibration generated by the lateral actuator 106 is efficiently transmitted to the electrostatic tactile panel/touch panel 101, which makes it possible to generate large acceleration on the electrostatic tactile panel/touch panel 101.

The features of the structure are described below. The lateral actuator 106 is strongly coupled to the base 105, a linkage is strongly coupled to the lateral actuator 106, and the linkage and the carrier 104 are strongly coupled with each other. Here, "strongly coupled" means that the components are coupled to each other without any play or looseness at the joint in the vibration direction. In this embodiment, the respective components are fastened to each other strongly with screws. Furthermore, the carrier 104 and pedestals 130 are strongly coupled, the pedestals 130 and the beams 108 are strongly coupled, the beams 108 and the columns 109 are strongly coupled, and the columns 109 and the electrostatic tactile panel/touch panel 101 are strongly coupled.

As described above, from the lateral actuator 106 to the electrostatic tactile panel/touch panel 101, the respective components are coupled to each other without any play or looseness in the vibration direction, and therefore, the vibration generated by the lateral actuator 106 is transmitted to the electrostatic tactile panel/touch panel 101 efficiently without attenuated.

Embodiment 3

Embodiment 3 differs from Embodiment 1 in the method to provide feedback to make the user perceive the position of the object. Specifically, the electrostatic tactile panel 200 is replaced with another component.

One example is to replace the electrostatic tactile panel 200 with a thermal display. The thermal display is configured to change the surface temperature. In order to provide feedback to make the user perceive the position of an object, a display screen can be configured to have arrays of small-sized thermal displays, and by controlling the temperature of the thermal display corresponding to the display position of the object so as to differ from that of other thermal displays, feedback to perceive the user of the object position can be provided.

Another example is to replace the electrostatic tactile panel 200 with a display made of magnetic fluid and arrays of electromagnet and configured to provide feedback to a prescribed position by actuating the magnetic fluid. By controlling the viscosity of the fluid in a position corresponding to the display position of the object, feedback to perceive the user of the object position can be provided.

Yet another example is to replace the electrostatic tactile panel 200 with a display that has recesses and protrusions on the surface. This display has a transparent polymer layer over a layer having very small holes, and the recesses and protrusions on the surface are formed by injecting fluid from those very small holes. By controlling the display so that the fluid is injected through the very small holes corresponding to the display position of the object, feedback to perceive the user of the object position can be provided.

The control method for the electronic device 10 of Embodiment 3 is the same as that of the electronic device 10 of Embodiment 1 except for the control process to provide the feedback to make the presence of the object 220 perceived, and therefore, the description thereof is omitted.

Embodiment 4

In Embodiment 4, the control device 110 updates the baseline. Because the size of the force applied to the force sensor 102 changes due to external environment such as temperature or atmospheric pressure, usage frequency, and the like, it is necessary to update the baseline periodically.

In order to update the baseline, the control device 110 needs to accumulate a prescribed number of measurement values measured by the force sensor 102 when no force is applied on the force sensor 102. Thus, the control device 110 needs to correctly identify the state in which no force is applied to the force sensor 102, and accumulate the measurement values. If the baseline was updated using the measurement values that were measured when the force sensor 102 is applied with a force, it would not be possible to appropriately detect the press event and the like.

Figure 8:
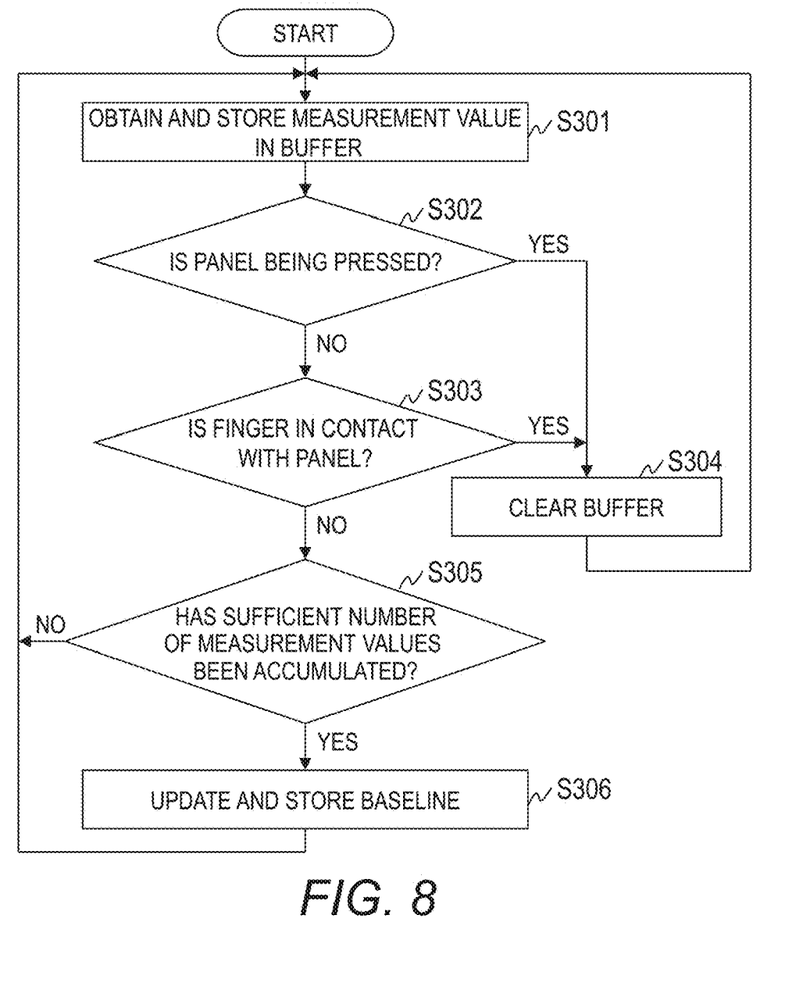
FIG. 8 is a flowchart for explaining baseline updating processes performed by a control device of Embodiment 4.
Figure 9:
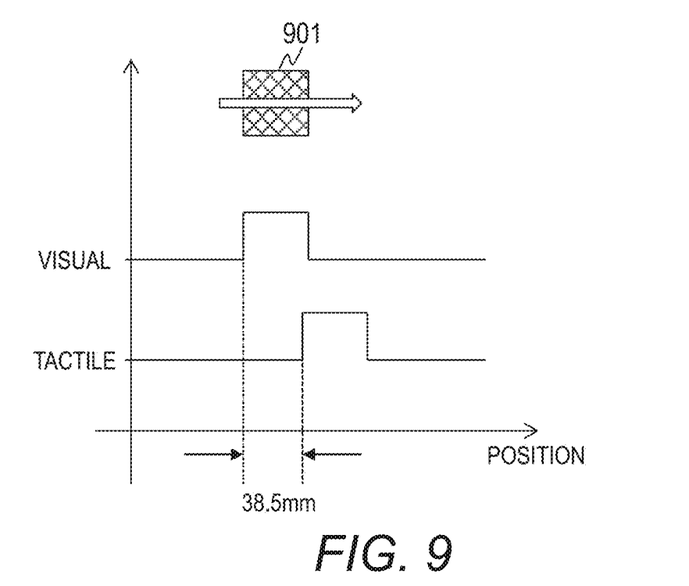
FIG. 9 is a diagram illustrating a misalignment between a display position of an object and a position of the object perceived through feedback on a conventional touch panel.

FIG. 8 is a flowchart for explaining baseline updating processes performed by the control device 110 of Embodiment 4.

In this embodiment the baseline updating process is performed by the press detection unit 114. The control device 110 may alternatively include a baseline updating unit that performs the baseline updating process.

The cycle to perform the baseline updating process may be the same as or differ from the cycle to perform the detection process.

The press detection unit 114 obtains the value measured by the force sensor 102 and stores the value in a buffer (Step S301). The buffer is included in the storage device 120.

The press detection unit 114 determines whether the electrostatic tactile panel/touch panel 101 is pressed or not based on the measured value of the force (Step S302). For example, the press detection unit 114 determines whether the value of the force is greater than the threshold value or not. The threshold value may be the same as or differ from the threshold value used in Step S212.

If the press detection unit 114 determines that the electrostatic tactile panel/touch panel 101 is pressed, the press detection unit 114 clears the buffer (Step S304). Thereafter, the press detection unit 114 returns to Step S301.

If the press detection unit 114 determines that the electrostatic tactile panel/touch panel 101 is not pressed, the press detection unit 114 determines whether a finger of the user is in contact with the electrostatic tactile panel/touch panel 101 or not (Step S303). For example, the press detection unit 114 determines whether a signal is detected or not. Alternatively, the press detection unit 114 may perform the touch detection process, and determines whether the finger is in contact or not based on the detection result.

If the press detection unit 114 determines that a finger of the user is in contact with the electrostatic tactile panel/touch panel 101, the press detection unit 114 clears the buffer (Step S304). Thereafter, the press detection unit 114 returns to Step S301.

If the press detection unit 114 determines that a finger of the user is not in contact with the electrostatic tactile panel/touch panel 101, the press detection unit 114 determines whether the number of measurement values accumulated is greater than a threshold value or not (Step S305). That is, the press detection unit 114 determines whether the number of measurement values required to update the baseline has been reached or not.

If the number of measurement values accumulated is equal to or smaller than the threshold value, the press detection unit 114 returns to Step S301.

If the number of measurement values accumulated is greater than the threshold value, the press detection unit 114 calculates a baseline using the measurement values accumulated in the buffer, and sets the calculated baseline (Step S306). Thereafter, the press detection unit 114 returns to Step S301. For example, the press detection unit 114 calculates the average value of the measurement values as the baseline.

Through the processes described above, the timing to update the baseline can be appropriately controlled. As a result, it is possible to appropriately detect a press event and the like.

As set forth above, embodiments of this invention have been described; however, this invention is not limited to the foregoing embodiments. Although the embodiments have been described using a liquid crystal display device as a representative case, the display device can be a different display device such as an organic EL display device. Those skilled in the art can easily modify, add, or convert each element in the foregoing embodiment within the scope of this invention. A part of the configuration of one embodiment can be replaced with a configuration of another embodiment or a configuration of an embodiment can be incorporated into a configuration of another embodiment.

A part or the entirety of each of the above configurations, functions, processing units, processing means, and the like may be realized by hardware.

What is claimed is:

1. An electronic device comprising:
    a display that displays a user interface including at least one object;
    a touch panel that is provided on the display, detects coordinates of a user touch point on the display, and presents tactile feedback for the user;
    a carrier,
    a base, and
    an actuator,
    wherein the carrier, the base, and the actuator, together detect an operation trigger based on the touch panel and generate mechanical vibration,
    wherein the carrier, the base, and the actuator are connected to the display,
    wherein the carrier is connected to the base via a plate spring and the actuator,
    wherein one end of the actuator is strongly coupled to the base and the other end of the actuator is strongly coupled to the carrier,
    wherein the actuator generates the mechanical vibration in a direction substantially parallel to the direction that is perpendicular to a direction of the user pressing the display screen, and
    wherein the plate spring controls vibration in a direction substantially parallel to the horizontal direction of the display screen.

2. An electronic device comprising:
    a display that displays a user interface including at least one object;
    a touch panel that is provided on the display, detects coordinates of a user touch point on the display, and presents tactile feedback for the user;
    a force sensor that measures a force generated by the user pressing the display screen;
    a carrier,
    a base, and
    an actuator,
    wherein the carrier, the base, and the actuator together detect an operation trigger based on the force and generate mechanical vibration,
    wherein the carrier, the base, and the actuator are connected to the display via the force sensor,
    wherein the carrier is connected to the base via a plate spring and the actuator,
    wherein the actuator generates the mechanical vibration in a direction substantially parallel to the direction that is perpendicular to a direction of the force,
    wherein the plate spring controls vibration in a direction substantially parallel to the horizontal direction of the display screen, and
    wherein one end of the actuator is strongly coupled to the base and the other end of the actuator is strongly coupled to the carrier.

3. An electronic device comprising:
    a display that displays a user interface including at least one object;
    a touch panel that is provided on the display, detects coordinates of a user touch point on the display, and presents tactile feedback at a prescribed point for the user to perceive the presence of an object;
    a force sensor that measures a force generated by the user pressing the display screen;
    a carrier, a base, and an actuator, wherein the carrier, the base, and the actuator together detect an operation trigger based on the force and generate mechanical vibration, wherein the carrier, the base, and the actuator are connected to the display via the force sensor, wherein the actuator generates the mechanical vibration in a direction substantially parallel to the direction that is perpendicular to a direction of the force, wherein the force sensor is composed of a beam that is provided on the carrier and a strain gauge that is provided on the beam, wherein the beam moves in the direction of the force and is connected in the direction of the mechanical vibration without play, and wherein one end of the actuator is strongly coupled to the base and the other end of the actuator is strongly coupled to the carrier.

4. A method for controlling an electronic device comprising a display that displays a user interface including at least one object;

a touch panel that is provided on the display, detects coordinates of a user touch point on the display, and presents tactile feedback for the user;

a force sensor that measures a force generated by the user pressing the display screen;

a carrier, a base, and an actuator, wherein the carrier, the base, and the actuator together detect an operation trigger based on the force and generate mechanical vibration, wherein the carrier, the base, and the actuator are connected to the display via the force sensor, wherein the carrier is connected to the base via a plate spring and the actuator, wherein the actuator generates the mechanical vibration in a direction substantially parallel to the direction that is perpendicular to a direction of the force, wherein the plate spring controls vibration in a direction substantially parallel to the horizontal direction of the display screen, and wherein one end of the actuator is strongly coupled to the base and the other end of the actuator is strongly coupled to the carrier; the method comprising:

identifying, by the touch panel, an object for which tactile feedback is presented, based on setting information of the user interface;

presenting, by the touch panel, tactile feedback at a position of the identified object in the display screen; and detecting, by the carrier, the base, and the actuator, the value of the force at the position of the identified object that is greater than a threshold value as the operation trigger, and generating the mechanical vibration for the user to perceive that an operation performed on the identified object has been accepted.

5. A method for controlling an electronic device comprising:

a display that displays a user interface including at least one object;

a touch panel that is provided on the display, detects coordinates of a user touch point on the display, and presents tactile feedback at a prescribed point for the user to perceive the presence of an object;

a force sensor that measures a force generated by the user pressing the display screen;

a carrier, a base, and an actuator, wherein the carrier, the base, and the actuator together detect an operation trigger based on the force and generate mechanical vibration, wherein the carrier, the base, and the actuator are connected to the display via the force sensor, wherein the actuator generates the mechanical vibration in a direction substantially parallel to the direction that is perpendicular to a direction of the force, wherein the force sensor is composed of a beam that is provided on the carrier and a strain gauge that is provided on the beam, wherein the beam moves in the direction of the force and is connected in the direction of the mechanical vibration without play, and wherein one end of the actuator is strongly coupled to the base and the other end of the actuator is strongly coupled to the carrier; the method comprising:

identifying, by the touch panel, an object for which tactile feedback is presented, based on setting information of the user interface;

presenting, by the touch panel, tactile feedback at a position of the identified object in the display screen; and detecting, by the carrier, the base, and the actuator, the value of the force at the position of the identified object that is greater than a threshold value as the operation trigger, and generating the mechanical vibration for the user to perceive that an operation performed on the identified object has been accepted.

\* \* \* \* \*